United States Patent [19]

Miyazaki et al.

[11] 4,331,286
[45] May 25, 1982

[54] METHOD FOR PRESSURE BONDING METAL MEMBERS BY UTILIZING EUTECTIC REACTION

[75] Inventors: Kunio Miyazaki; Takeo Tamamura, both of Hitachi; Tomio Iizuka, Tokaimura; Hitoshi Suzuki, Hitachi; Izumi Ochiai, Ohiramachi all of Japan

[73] Assignee: Hitachi, Ltd., Tokyo, Japan

[21] Appl. No.: 27,837

[22] Filed: Apr. 6, 1979

[30] Foreign Application Priority Data

Apr. 10, 1978 [JP] Japan .................................. 53-41186

[51] Int. Cl.³ .................. B23K 20/00; B23K 20/22
[52] U.S. Cl. .................................. 228/198; 228/208; 228/243; 228/194
[58] Field of Search ............... 228/198, 193, 194, 195, 228/208, 243, 235; 428/653, 641

[56] References Cited

U.S. PATENT DOCUMENTS

| 3,180,022 | 4/1965 | Briggs | 228/198 |
| 3,436,806 | 4/1969 | Supan | 228/193 |
| 4,046,305 | 9/1977 | Brown | 228/194 |

OTHER PUBLICATIONS

Lynch et al., "Brazing by the Diffusion-Controlled Formation of a Liquid Intermediate Phase" from *Welding Research Supplement*, Feb. 1959, pp. 85–89.

Primary Examiner—Daniel C. Crane
Attorney, Agent, or Firm—Craig & Antonelli

[57] ABSTRACT

A method for pressure bonding metal members by utilizing eutectic reaction comprising the steps of bringing two metal members of dissimilar metals to be bonded into contact with each other under a predetermined contacting pressure $P_1$ lower than the plastic deformation pressures of the metals of the two members and heating the contacting surfaces of the two members to a temperature lower than melting point temperatures of the metals and not lower than the eutectic temperature thereof to produce a liquid of eutectic composition by eutectic reaction between the surfaces of the two members to be bonded, applying an upset pressure $P_2$ higher than the contacting pressure $P_1$ to the surfaces to be bonded to squeeze out the liquid from the contacting surfaces of the two members to outside, and cooling the bonded surfaces of the two members. When the members to be joined by pressure bonding are of the same metal, an insert comprising an element undergoing eutectic reaction with the metal of the two members is interposed between the surfaces of the two members to be bonded.

20 Claims, 9 Drawing Figures $\overline{5\mu}$ $\overline{5\mu}$

METHOD FOR PRESSURE BONDING METAL MEMBERS BY UTILIZING EUTECTIC REACTION

BACKGROUND OF THE INVENTION

This invention relates to methods for pressure bonding members of dissimilar metals or the same metal by utilizing eutectic reaction, and more particularly to a method for pressure bonding members or aluminum and copper by utilizing eutectic reaction.

In one type of method for bonding members of dissimilar metals known in the art, diffusion is utilized for effecting bonding of the members. In diffusion bonding, the members to be bonded are brought into contact with each other and heated at a suitable temperature lower than the melting point temperatures of the dissimilar metals, so as to effect diffusion of elements and molecules.

Diffusion bonding is based on the diffusion of the elements and molecules. Thus the condition of the contacting surfaces of the members to be bonded is an important factor in effecting bonding. To be more specific, it is essential that the contacting surfaces are scrupulously clean and free from oxides and other surface contamination. Meeting the aforesaid requirement in diffusion bonding means the provision of a solution to an important problem. It is not too much say that this is the determining factor in effecting diffusion bonding successfully.

As a means for solving the aforesaid problem in diffusion bonding, a method has been developed in which at least one projection is formed on the contacting surface of one member and force fitted in the contacting surface of the other member to be bonded to the one member. When the members to be bonded are formed of aluminum and copper, the projection is generally formed on the member of copper, and the member of aluminum is heated to a temperature lower than the melting point temperature of aluminum when the projection is force fitted in the contacting surface of the member of aluminum. It is to be noted that this method is not essentially a method intended to removed oxides and other surface contamination from the contacting surfaces of the members to be bonded. This method aims at imparting a mechanical bonding force to the contacting surfaces of plastic deformation to which the members to be bonded are subjected when the projection on one member is force fitted in the other member. This method has not yet provided a satisfactory solution to the aforesaid problem because the joint formed by this method has subsequently ruptured at the bond in tension tests conducted on the bonded members.

SUMMARY OF THE INVENTION

This invention has as its object the provision of a method for pressure bonding metal members which is capable of effecting pressure bonding even if oxides and other surface contamination are present on the contacting surfaces of the metal members to be pressure bonded and in which the bond formed between the metal members do not rupture.

In the broadest scope, the present invention provides a method for pressure bonding metal members which comprises the steps of forming contacting surfaces of at least two metal members, wherein the contacting surfaces contain an element which forms a eutectic composition upon heating to a temperature at which eutectic reaction takes place, heating the contacting surfaces under a pressure lower than the plastic deformation pressure of the members for a time sufficient to form the eutectic composition, and increasing the contacting pressure applied to the contacting surfaces to squeeze out the liquid of eutectic composition from the contacting surfaces before the temperature becomes lower than eutectic temperature.

One aspect of the present invention consist in that two or more members of dissimilar metals which undergo eutectic reaction when heated to a temperature lower than the melting point temperatures of the metals are brought into contact with each other under a predetermined pressure lower than the plastic deformation pressures of the metals, the contacting surfaces of the members are heated to produce a liquid of eutectic composition by eutectic reaction, and an upset pressure is applied to the contacting surfaces of the two members to squeeze out the liquid to outside from the contacting surfaces and at the same time pressure bonding of the members is effected by the upset pressure.

A liquid phase is formed by eutectic reaction between the surfaces of members to be pressure bonded for the purpose of causing oxides and other surface contamination of the metal surfaces to be incorporated into the liquid and squeezed out therefrom to outside. The temperature at which the contacting surfaces of the members are heated to produce the liquid phase is not lower than the eutectic temperature of the metals and lower than the melting point temperatures thereof. Unless the metals are heated to a temperature not lower than the eutectic temperature, no eutectic reaction will take place. Also, if the metals are heated to a temperature higher than their melting point temperatures, then the bonding is fusion bonding and not pressure bonding.

The liquid phase formed by the eutectic reaction contains, as aforesaid, the oxides and other surface contamination of the metals to be pressure bonded, so that the liquid phase will produce a brittle material when converted into a solid state.

Therefore, if the liquid phase were allowed to solidify and remain in the interface of the pressure bonded members, the bond would rupture when tested by a tension test. Thus it is necessary to squeeze out the liquid to outside before solidifying. To this end, an upset pressure is applied to the surfaces of the members to be pressure bonded. The method of applying the upset pressure may be selected arbitarily. The upset pressure may be applied in any means so long as the pressure is applied to satisfactorily squeeze out the liquid to outside from the contacting surfaces of the members to be pressure bonded.

As the liquid is squeezed out, the contacting surfaces of the members to be pressure bonded become clean and substantially free from oxides and other surface contamination, so that pressure bonding of the surfaces takes place quickly and positively. What results is a joint of a satisfactory strength characteristic or a joint having a characteristic such that no rupture of the bond occurs when the bonded members are subjected to a tension test.

Preferably, one of the two members of dissimilar metals to be joined by pressure bonding is formed with at least one projection on the surface to be bonded, and the projection is force fitted in the surface of the other member to be bonded. This arrangement makes it possible to simplify means for bringing the members to be pressure bonded into intimate contact with each other.

The contacting surfaces of the two members are generally maintained in intimate contact with each other by making them flat and smooth by machining and applying pressure thereto. The aforesaid arrangement makes it possible to tolerate ordinary finishes of the surfaces and to reduce the pressure applied thereto.

When two members of aluminum and copper were pressure bonded to each other and the strength of the joint formed was tested, the method according to the present invention has shown a satisfactory result in that it is not at the bond but in the aluminum of the member that rupture occurred. In the case of a combination of aluminum and copper, the optimum heating temperature range is between eutectic temperature and eutectic temperature +50° C. If the heating temperature is higher than the eutectic temperature +50° C., the liquid becomes too great in quantity and may remain near the bond in the form of fins. Formation of fins mars the appearance of the joint, and it is time consuming to remove the fins. Also, when the members to be bonded are small parts or pipes, there is the danger that a large amount of liquid produced by eutectic reaction makes it impossible to keep the product in good shape. An upset pressure necessary for squeezing out he liquid produced by eutectic reaction from the contacting surfaces to be bonded and at the same time for effecting pressure bonding of the surfaces is preferably in the range between 1.5 and 7 kg/mm². The lower limit in the range or 1.5 kg/mm² is a minimum essential for squeezing out the liquid to provide surfaces to be bonded which are substantially free from oxides and other surface contamination, and the upper limit or 7 kg/mm² is the highest pressure necessary for effecting pressure bonding by utilizing eutectic reaction.

It is desirable that the bonded surfaces be immediately cooled as soon as the liquid is squeezed out therefrom, in any conceivable combination of dissimilar metals including aluminum and copper. Although the joint formed by the method according to the invention is higher in strength than the joint formed by the method of diffusion bonding of the prior art even if the bonded surfaces are not cooled, the strength of the joint can be increased by cooling the bonded surfaces. If no special cooling means is used to cool the bonded surfaces and the surfaces are cooled by natural cooling following the squeezing out of the liquid, eutectic reaction will take place again to produce a liquid phase, or a brittle intermetallic compound phase will be produced depending on the combination of the metals to be bonded, with a result that such phase will be present in a portion of the bonded surfaces. It is desirable that such phase does not exist in the bond formed between the surfaces of the members. Elimination of such phase from the bond makes it necessary, as noted above, to immediately cool the bonded surfaces. The bonded surfaces are preferably cooled to a temperature at which no liquid phase of eutectic reaction or no intermetallic compound phase is formed. However, the surfaces may be cooled to room temperature if it is desirable to simplify the process. It is necessary that cooling be effected at a rate high enough to avoid the formation of the liquid phase of eutectic reaction or the intermetallic compound phase. The end can be attained by blowing gas or liquid against the bonded surfaces. When the metals are aluminum and copper, the bonded surfaces should be cooled to about 100° C. immediately after the liquid is squeezed out, and the rate of cooling is preferably in the range between 10° and 500° C./sec. If the surfaces are cooled to a temperature below 100° C., then no eutectic reaction takes place and no intermetallic compound phase is formed. Also, when the cooling rate is higher than 10° C./sec, it is possible to inhibit the formation of the liquid phase and intermetallic compound phase to a degree such that a sound bond is produced between the surfaces of the members. It is meaningless to raise the cooling rate above the upper limit of 500° C./sec because such raise will only add to the cost of production.

The method of pressure bonding metals according to the invention has been outlined by referring to a combination of dissimilar metals. It is to be understood that the present invention is not limited to pressure bonding of dissimilar metals, and that the method can be applied to pressure bonding of members of the same metal, such as a combination of aluminum-aluminum or copper-copper, by using an insert interposed between the members to be bonded. The principles of the method according to the invention will be described by referring to the drawings.

DESCRIPTION OF THE PREFERRED EMBODIMENTS

Figure 1:
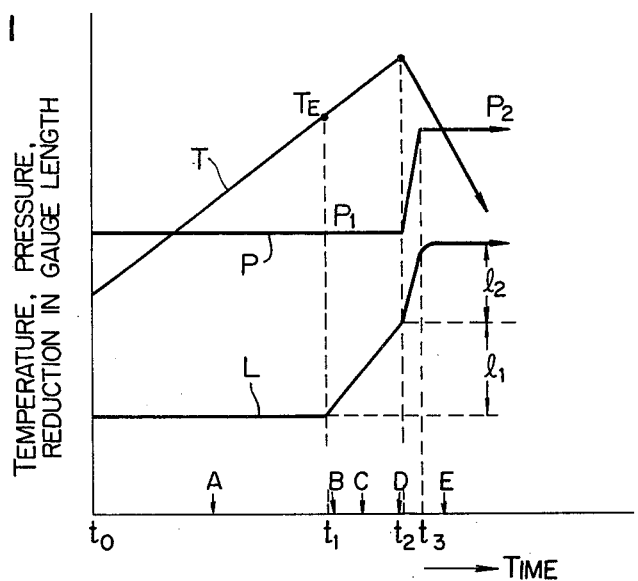
FIG. 1 is a diagrammatic representation of the pressure bonding cycle of the method according to the invention.
Figure 2A:
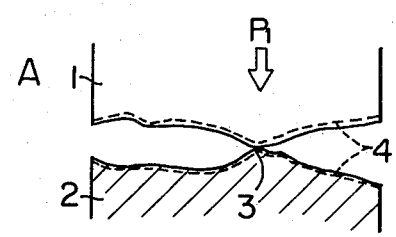
FIGS. 2A and 2B are views showing, stage by stage, the principles of the pressure bonding method according to the invention, FIG. 2A showing an embodiment wherein aluminum and copper are pressure bonded and FIG. 2B showing an embodiment wherein copper is pressure bonded to copper by using an insert.
Figure 2A:
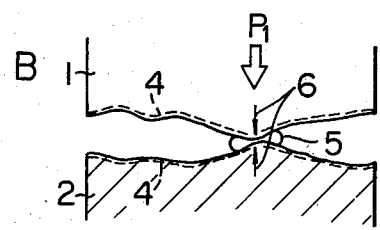
Figure 2A:
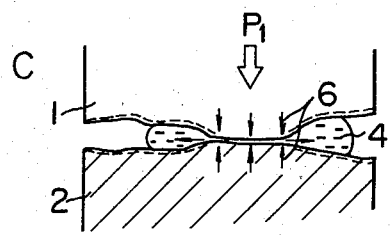
Figure 2A:
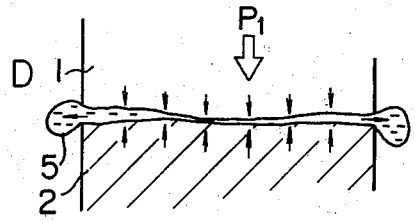
Figure 2A:
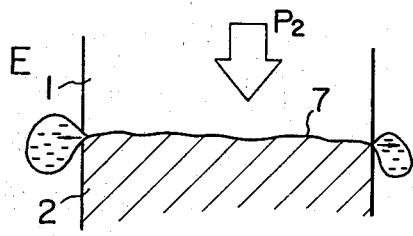
Figure 2B:
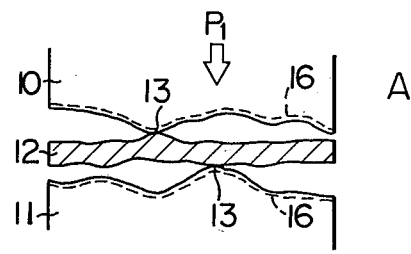
Figure 2B:
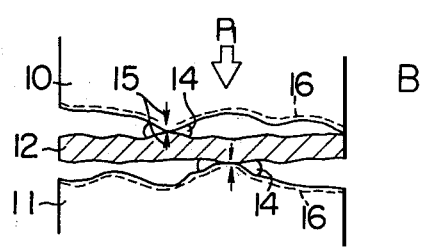
Figure 2B:
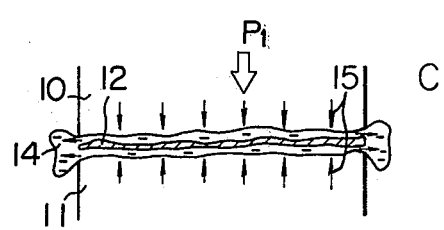
Figure 2B:
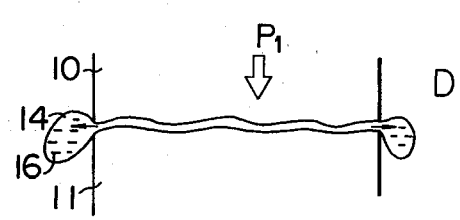
Figure 2B:
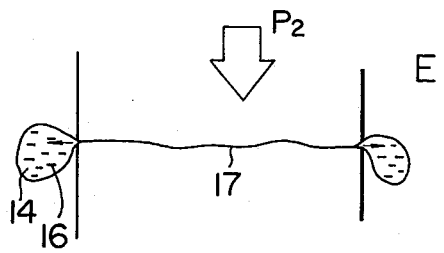

FIG. 1 is a view of the pressure bonding cycle of the method according to the present invention, and FIGS. 2A and 2B show, stage by stage, the principles of the pressure bonding method according to the present invention. In FIG. 1, a curve T represents temperature and a point $T_E$ represents a eutectic temperature. A curve P represents pressure, with $P_1$ representing a contacting pressure under which members to be bonded are brought into contact with each other, and $P_2$ representing an upset pressure for squeezing out a liquid of eutectic composition and at the same time effecting pressure bonding of the members. A curve L represents a reduction in gauge length. In this specification, the term 'a reduction in gauge length' is defined as the difference between the gauge length of a predetermined value obtained by using the interface of the members to be bonded as a mid-point and the gauge length which is reduced by the pressures $P_1$ or $P_2$. $l_1$ represents a reduction in gauge length brought about by the production of a liquid of eutectic composition under the contacting pressure $P_1$, and $l_2$ represents a reduction in gauge length brought about by the squeezing out to outside of the liquid of eutectic composition under the upset pressure $P_2$. In the horizontal axis, $t_o$ indicates a point in time at which a heating temperature begins to rise after the members to be bonded are brought into contact with each other under the contacting pressure $P_1$, $t_1$ indicates a point in time at which the heating temperature reaches a eutectic temperature, $t_2$ indicates a point in time at which the pressure is switched from $P_1$ to $P_2$, and $t_3$ indicates a point in time at which the pressure has reached the upset pressure $P_2$. The symbols A, B, C, D and E in the horizontal axis in FIG. 1 designate different stages of operation used for describing the pressure bonding method according to the invention by referring to FIG. 2.

The principles of the pressure bonding method according to the present invention will now be described stage by stage by referring to FIG. 2.

I. Pressure Bonding of Dissimilar Metals (Al-Cu) . . . . See FIG. 2A.

Stage A

A member 1 of aluminum and a member 2 of copper are brought into contact with each other at contacting surfaces thereof and maintained under the contacting pressure $P_1$, and the contacting surfaces of the members 1 and 2 are heated, whereby an oxide film 4 on the contacting surfaces may be broken to form a plurality of minute junctions 3, so that contacting points of aluminum and copper free from an oxide coat 4 are provided.

Stage B

At this stage, the temperature of the contacting surfaces is increased to a eutectic temperature level. As soon as the temperature reaches the eutectic temperature level, production of a liquid 5 of eutectic composition by the eutectic reaction between aluminum and copper begins from the junctions 3.

Stage C

With the progress of production of the liquid 5 of eutectic composition from the junctions 3, aluminum and copper begin to melt in the direction of arrow 6, and the contacting surfaces maintained under the contacting pressure $P_1$ rapidly expand and are flattened, with a result that the oxide coat 4 on the contacting surfaces is broken to pieces and incorporated in the liquid 5.

Stage D

At this stage, eutectic reaction takes place throughout the surfaces to be bonded, and aluminum and copper melt out from the members 1 and 2 in equal quantity as indicated by the arrows 6.

Stage E

The upset pressure $P_2$ greater than the contacting pressure $P_1$ is applied with an impact to the members 1 and 2, to thereby squeeze out from the contacting surfaces to be bonded the liquid 5 remaining therein and at the same time to effect pressure bonding of the members 1 and 2 by the pressure $P_2$. After an application of the upset pressure $P_2$ for a very short time, heating is stopped and the bonded surfaces are cooled to prevent the liquid 5 from being further produced at an interface 7 formed by the bonded surfaces, and a high temperature zone of the bonded members 1 and 2 is rapidly cooled (substantially to 200° C.) to prevent a brittle compound phase from being produced between aluminum and copper. The upset pressure should be applied before the temperature of the contacting surfaces becomes lower than the eutectic temperature.

II. Pressure Bonding of the Same Metal (Al-Al, Cu-Cu) . . . . See FIG. 2B

Stage A

A thin sheet 12 of a metal of low melting point which undergoes eutectic reaction with the metal of members 10 and 11 is placed as an insert between surfaces of the members 10 and 11 to be bonded, the members 10 and 11 and the insert 12 are brought into contact with one another and maintained under the contacting pressure $P_1$, and heating of the members 10 and 11 and the insert 12 is initiated. When the members 10 and 11 are formed of aluminum, the insert 12 is formed of silver, copper, silicon or a hypereutectic alloy of one of these elements with aluminum. When the members 10 and 11 are formed of copper, the insert 12 is formed of silver, aluminum or a hypereutectic alloy of one of these elements with copper.

Stage B

Production of a liquid 14 of eutectic composition by eutectic reaction begins from junctions 13 between the members 10 and 11 and the insert 12, when the heating temperature reaches a eutectic temperature level. This causes the metal of the members 10 and 11 to melt out as shown at 15. When the insert 12 is of a hypereutectic alloy, the members 10 and 11 and the insert 12 begin to melt at the eutectic temperature of the insert 12 itself. Eutectic reaction also takes place between the excess alloying elements of the molten insert and the metal of the members 10 and 11, with a result that the metal of the members 10 and 11 melts out to break and remove an oxide coat 16.

Stage C

At this stage, eutectic reaction takes place throughout the surfaces to be bonded, and the insert 12 is wasted to become further smaller in thickness.

Stage D

The insert 12 is completely melted and disappears, putting an end to the eutectic reaction.

Stage E

The upset pressure $P_2$ greater than the contacting pressure $P_1$ is applied with an impact to the surfaces to be bonded, to thereby squeeze out to outside the residual liquid of eutectic composition and at the same time effect pressure bonding of the members 10 and 11 at the surfaces to be bonded. The upset pressure should be applied before the temperature of the contacting surfaces becomes lower than the eutectic temperature. Since the members 10 and 11 are of the same metal, no eutectic reaction takes place at an interface 17 formed by the bonded surfaces, so that there is no need to rapidly cool the bond 17, following the pressure bonding of the members 10 and 11.

Although there are shown example in which only two metal members are bonded in accordance with the present invention, it goes without saying that more than two metal members are bonded.

The principles of the method according to the invention for effecting pressure bonding of members of dissimilar metals and of the same metal have been described stage by stage hereinabove. Microscopic photographs of the interface formed by the bonded surfaces are shown in FIGS. 4 and 5.

Figure 3:
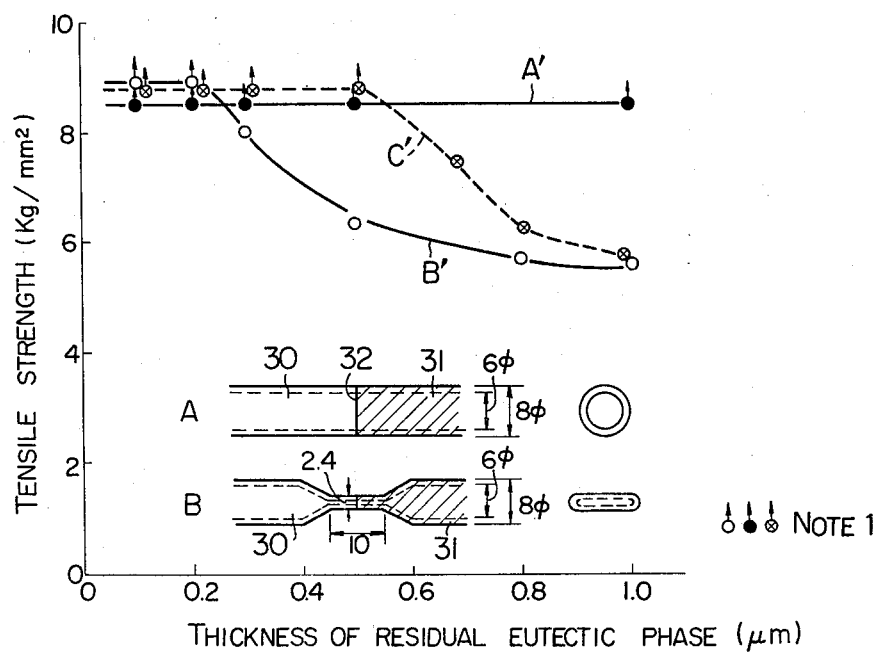
FIG. 3 is a diagrammatic representation of the relation between the thickness of the residual eutectic phase and tensile strength obtained when a pipe of pure aluminum is pressure bonded to a pipe of pure copper.
Figure 4:
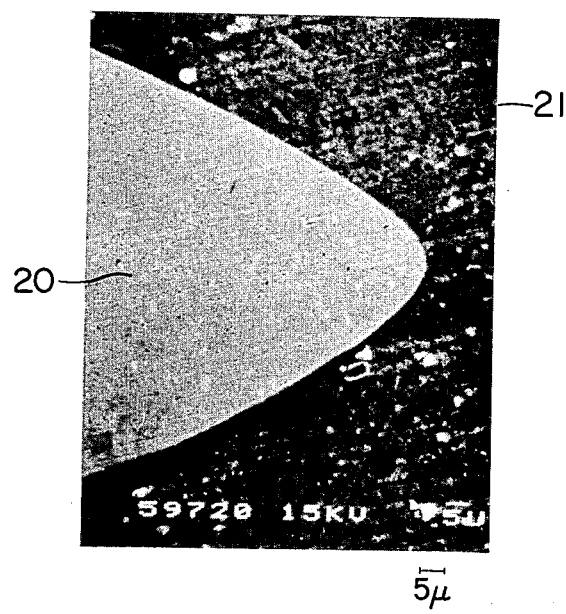
FIG. 4 is a microscopic photograph showing an example of the bond formed by pressure bonding between a rod of pure aluminum and a rod of pure copper, wherein no eutectic phase is present in the bond.
Figure 5:
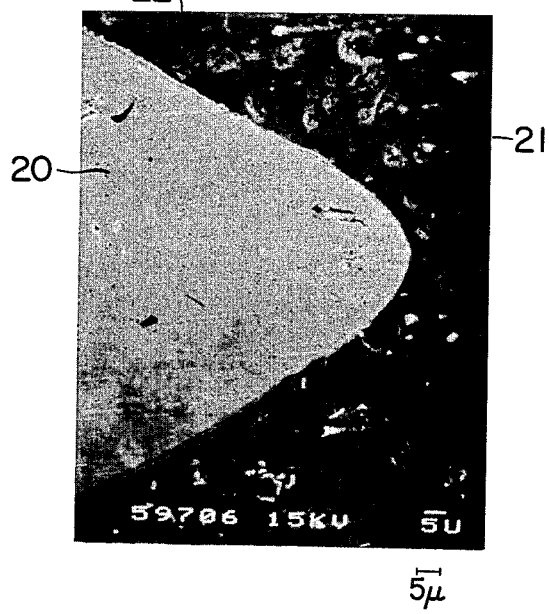
FIG. 5 is a microscopic photograph showing an example of the bond formed by pressure bonding between a rod of pure aluminum and a rod of pure copper, wherein the eutectic phase remains in the bond.

In FIGS. 4 and 5, a rod 20 of pure copper formed at its forward end with a wedge-shaped projection is bonded to a rod 21 of pure aluminum by pressure bonding. In FIG. 4, no eutectic phase is seen at the interface, but in FIG. 5 there is a eutectic phase 22 of small thickness remaining at the interface. As described hereinabove, the presence of a residual eutectic phase at the interface of the bonded members is not desirable. Tests were conducted to determine the influence of the residual eutectic phase on the tensile strength of members pressure bonded to each other. The results of the tests are shown in FIG. 3.

FIG. 3 is a graph showing the relation between the thickness of the residual eutectic phase and tensile strength in pressure bonding of a pipe of pure aluminum to a pipe of pure copper. In FIG. 3, A designates specimens obtained by joining pipes 30 and 31 of pure aluminum and pure copper respectively of 8 mm in outer diameter and 6 mm in inner diameter at an interface 32 by the pressure bonding method according to the present invention. B designates specimens obtained by subjecting the specimens A to flattening at a flattening rate of 70% so that the specimens A are compressed at the interface to reduce the outer diameter by 2.4 mm across the width of 10 mm. A straight line A' represents the tensile strengths of the specimens A (flattening rate, 0%) determined by tension tests. A curve B' in FIG. 3 represents the tensile strengths of the specimens B (flattening rate, 70%) determined by tension tests. A curve C' represents the tensile strengths of specimens, not shown, determined by tension tests, the specimens of this case being compressed at a flattening rate of 40%. In Note 1 of FIG. 3, there are points each having an upwardly directed arrow, which represent specimens in which rupture occurred in the members bonded. Other points with no arrows represent specimens in which rupture occurred at the bond between the members bonded.

In FIG. 3, it will be seen that in the case of specimens A that had not been flattened, rupture occurred in the member of aluminum when there was a residual eutectic phase of a thickness of as small as 1μ. In the case of specimens B that had been flattened at a flattening rate of 70%, it will be seen that the bonded members separated from each other at the interface and no rupture occurred in the bonded members, when the residual eutectic phase had a thickness of over 0.2μ. It will be seen that when the specimens were flattened at a flattening rate of 40%, no rupture occurred in the bonded members when the residual eutectic phase had a thickness of over 0.5μ.

In view of the results of tests described hereinabove, it will be evident that the thickness of the residual eutectic phase should be below 0.2μ to obtain a bond, at the interface, of enough strength to withstand rupture.

It is added that the aforesaid tests were conducted under severe conditions in order that such tests may be conducted on merchandise planned to be produced by the assignee of the present application. Therefore, when the members to be bonded are not pipes or when the members to be bonded are of the same metal (Al—Al, for example), a residual eutectic phase of a slightly larger thickness than 0.2μ can be tolerated. The essentials of the present invention reside in that the surfaces of the members to be joined by pressure bonding are cleaned by having oxides and other surface contamination broken and incorporated in a liquid of eutectic composition, and pressure bonding of the members is effected by applying an upset pressure in such a manner that the liquid of eutectic composition having the impurities incorporated therein is squeezed out from the contacting surfaces to be bonded prior to effecting pressure bonding thereof. Although it is preferable to form a wedge-shaped projection at a forward end of one of the metal members to be bonded, it is not essential to form such projection.

Examples of pressure bonding of members of dissimilar metals and of the same metal carried out by the method according to the present invention will now be described.

EXAMPLE 1

Figure 6:
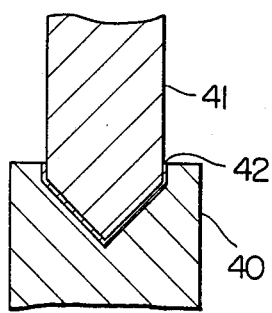
FIGS. 6 and 7 are sectional views of a rod of pure aluminum and a rod of pure copper joined by pressure bonding according to one embodiment of the present invention.
Figure 7:
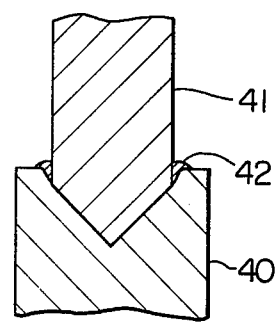

A rod of pure aluminum and a rod of pure copper were prepared. The rod of pure aluminum had a diameter of 8 mm, and the rod of pure copper had a diameter of 5 mm. The pure copper rod was formed at one end surface thereof with a wedge-shaped portion of a vertical angle of 45° and had a surface coarseness of ±5μ. The wedge-shaped portion of the pure copper rod was force fitted into one end of the pure aluminum rod by using a rest-raining jig, and the vicinity of the portions of the two rods force fitted one into the other was heated to 550° C. by high frequency induction heating. Since the eutectic temperature of pure copper and pure aluminum is about 548° C., the heating temperature exceeded the eutectic temperature. After the heating temperature had been maintained at the aforesaid level for 5 seconds, heating was interrupted and an upset pressure of 5 kg/mm$^2$ was applied to the surfaces to be bonded of the pure aluminum rod and pure copper rod substantially simultaneously as heating was interrupted. Substantially simultaneously as the application of the upset pressure, blowing of argon gas against the bonded surfaces was begun to avoid the production of a liquid of eutectic composition by eutectic reaction and the formation of an intermetallic compound. Prior to application of the upset pressure, a liquid phase 42 existed between the contacting surfaces of the pure aluminum rod 40 and the pure copper rod 41 as shown in FIG. 6, but the liquid phase 42 was squeezed out to outside from the bonded surfaces as shown in FIG. 7 following application of the upset pressure. Specimens were obtained from the joint formed by pressure bonding as described above and tested by tension and bending tests. In the two tests, the specimen were ruptured at the pure aluminum rod.

EXAMPLE 2

Figure 8:
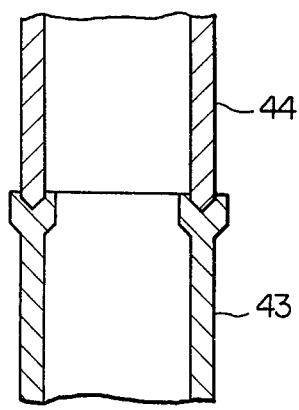
FIG. 8 is a sectional view of a pipe of pure aluminum and a pipe of pure copper joined by pressure bonding according to another embodiment of the present invention.

A pipe of pure aluminum and a pipe of pure copper were prepared. The pipe of pure aluminum had an outer diameter of 8.0 mm, an inner diameter of 6.0 mm and a length of 90.0 mm, and the pipe of pure copper had an outer diameter of 8.0 mm, an inner diameter of 6.4 mm and a length of 85.0 mm. Prior to effecting pressure bonding, the pure aluminum pipe was compressed at one end surface thereof to increase the thickness of the pipe in the vicinity of the end surface to 1.8 times as great as the original value. Meanwhile the pure copper rod was formed at one end surface thereof with a wedge-shaped portion of a vertical angle of 45° and finished to have a surface coarseness of ±5μ. Then, the wedge-shaped portion of the pure copper pipe 44 was force fitted into the compressed end surface of the pure aluminum pipe 43 as shown in FIG. 8. Following force fitting, the vicinity of the portions of the two pipes force fitted one into the other was heated to 550° C. by high frequency induction heating. After the heating temperature had been maintained at the aforesaid level for 5 seconds, heating was interrupted and simultaneously as the interruption of heating an upset pressure of 5 kg/mm$^2$ was applied to the surfaces to be bonded and blowing of argon gas against the bonded surfaces was begun. Cooling of the bonded surfaces to 100° C. took place at a rate of about 90° C./sec on an average. Examination of the joint obtained by the aforesaid process with a microscope at a magnification of 400× has shown that the interface formed by the bonded surfaces of pure aluminum and pure copper was free from a eutectic phase due to eutectic reaction and an intermetallic compound. Specimens of the joint were subjected to tension and bending tests. The results of the tests show that no rupture occurred at the interface but occurred in the pure aluminum.

EXAMPLE 3

A pure aluminum pipe and a pure copper pipe having an outer diameter of 8 mm, an inner diameter of 6 mm and a length of 90 mm were prepared. The contacting surfaces of these pipes were flat and had a surface coarseness of ±5μ. The pipes were brought into contact with each other under a contacting pressure of 0.8 kg/mm$^2$ and the vicinity of the contacting surfaces of the pipes was heated to 550° C. Then, an upset pressure of 5.5 kg/mm$^2$ was applied to the pipes to effect pressure bonding. The total period of time required for effecting pressure bonding was 5 seconds. Following completion of pressure bonding, the bonded surfaces of the pipes were rapidly cooled by blowing argon gas thereagainst. Tension tests conducted on the specimens of the joint formed by the aforesaid process show that rupture occurred in the metals under a load of 12.5 kg/mm$^2$.

EXAMPLE 4

A pure copper rod and a pure silver rod of a diameter of 4 mm and a length of 90 mm were prepared. The contacting surfaces of these rods were flat and had a surface coarseness of ±5μ. The rods were brought into contact with each other under a contacting pressure of 0.8 kg/mm$^2$ and the vicinity of the contacting surfaces of the rods was heated to 782° C. (these metals have a eutectic temperature of 780° C.). Then, an upset pressure of 4.2 kg/mm$^2$ was applied to the rods to effect pressure bonding. The total period of time required for effecting pressure bonding was 7 seconds. Following completion of pressure bonding, the bonded surfaces of the rods were rapidly cooled by blowing argon gas thereagainst. Tension tests conducted on the specimens of the joint formed by the aforesaid process show that rupture occurred in the metals under a load of 12.5 kg/mm$^2$.

The examples described hereinabove involve pressure bonding of members of dissimilar metals to each other. Examples of using an insert to effect pressure bonding of members of the same metal will now be described.

The following examples 5–8 refer to pressure bonding of members of pure aluminum to each other. In each example, two pipes of pure aluminum of an outer diameter of 8 mm, an inner diameter of 6 mm and a length of 90 mm were prepared. The contacting surfaces of the pipes were flat and had a surface coarseness of ±5μ.

EXAMPLE 5

A sheet of pure copper of a thickness of 0.1 mm was used as an insert which was interposed between the two pipes of pure aluminum. The pipes were maintained in contact with each other through the insert under a contacting pressure of 0.8 kg/mm$^2$, and the contacting surfaces were heated to 550° C. Then, an upset pressure of 5.1 kg/mm$^2$ was applied to the pipes to effect pressure bonding. The total period of time required for effecting pressure bonding was 5 seconds. Since the members to be joined were both of aluminum, there was no need to effect rapid cooling. Tension tests conducted on the specimens of the joint formed by the aforesaid process show that rupture occurred in the metal of the pipes under a load of 8.7 kg/mm$^2$.

EXAMPLE 6

In effecting pressure bonding, a sheet of silver of a thickness of 0.1 mm was used as an insert. The heating temperature was 568° C. (the eutectic temperature of silver and aluminum is 566° C.). The contacting pressure, upset pressure and total time required for effecting pressure bonding were the same as described by referring to example 5. Tension tests of the specimens of the joint formed by the aforesaid process show that rupture occurred in the metal of the pipe under a load of 8.7 kg/mm$^2$.

EXAMPLE 7

Silicon was used as a material for an insert, and a coat of silicon of a thickness of 0.2μ was formed by vaporization deposition in vacua on each of the contacting surfaces of the two pure aluminum pipes. The pipes were brought into contact with each other at the contacting surfaces coated with silicon as aforesaid and joined by pressure bonding. The heating temperature was 579° C. (the eutectic temperature of aluminum and silicon is 577° C.). Other conditions were the same as those described by referring to Example 6. Tension tests conducted on the specimens of the joint formed by the aforesaid process show that rupture occurred in the metal of the pipes under the same load as described in Example 6.

EXAMPLE 8

A sheet of Al-18% Si of 0.1 mm in thickness was used as an insert, and pressure bonding was effected under the same conditions as described by referring to Example 7. Tension tests conducted on the specimens of the joint formed in this Example produced results similar to those of Example 7.

In Examples 9–10 presently to be described, members of pure copper were joined by pressure bonding. In each Example, two round bars of pure copper of 8 mm in diameter and 90 mm in length were prepared. The contacting surfaces of the two round bars were flat and had a surface coarseness of ±5μ.

EXAMPLE 9

A sheet of silver of 0.1 mm in thickness was used as an insert which was interposed between the two round bars of pure copper. The two round bars was maintained under a contacting pressure of 1.0 kg/mm$^2$ in contact with each other through the silver insert, and the contacting surfaces were heated to 782° C. (the eutectic temperature of copper and silver is 780° C.). An upset pressure of 7.0 kg/mm$^2$ was applied to the round bars to effect pressure bonding. The total period of time required for effecting pressure bonding was 7 seconds. Since the members to be joined were of copper, no rapid cooling was necessary. Tension tests conducted on the specimens of the joint formed by the aforesaid process show that rupture occurred in the metal of the pipes under a load of 21.5 kg/mm².

EXAMPLE 10

A sheet of aluminum of a thickness of 0.1 mm was used as an insert which was interposed between the two round bars of pure copper. The two round bars were maintained, under a contacting pressure of 1.0 kg/mm², in contact with each other through the lauminum insert, and the contacting surfaces were heated to 550° C. (the eutectic temperature of aluminum and copper is 548° C.). An upset pressure of 7.0 kg/mm² was applied to the round bars to effect pressure bonding. The total period of time required for effecting pressure bonding was 5 seconds. Tension tests conducted on the specimens of the joint formed by the aforesaid process show that rupture occurred in the metal of the pipes under a load of 21.5 kg/mm².

From the foregoing description, it will be appreciated that according to the method of pressure bonding of this invention, pressure bonding of metal members can be effected positively in a short period of time even if oxides and other surface contaimination are present on the contacting surfaces of the metal members. More specifically, the oxides and other surface contamination on the contacting surfaces of the metal members to be joined by pressure bonding are incorporated in a liquid of eutectic composition and discharged to outside when the liquid of eutectic composition is squeezed out to outside from the surfaces to be bonded by an upset pressure applied to the metal members, with a result that substantially no harmful foreign matter exists on the bonded surfaces of the metal members. Thus a joint of high strength can be formed by the metals of the members at an interface formed by the bonded surfaces, and rupture does not occur at such joint even if the pressure bonded members are subjected to tension tests.

What is claimed is:

1. A method for pressure bonding metal members which comprises the steps of:
   forming contacting surfaces of at least two metal members, wherein the contacting surfaces contain an element which forms a eutectic composition upon heating to a temperature at which a eutectic reaction takes place,
   heating the contacting surfaces under a pressure lower than a plastic deformation pressure of the members for a time sufficient to form the eutectic composition,
   increasing the contacting pressure applied to the contacting surfaces to squeeze out substantially all of the liquid of eutectic composition from the contacting surfaces before the temperature becomes lower than eutectic temperature, and
   cooling the bonded surfaces of the two members.

2. A method for pressure bonding metal members by utilizing eutectic reaction, comprising the steps of:
   bringing two members of dissimilar metals to be pressure bonded into contact with each other under a predetermined contacting pressure $P_1$ lower than plastic deformation pressures of the metals of the two members and heating contacting surfaces of the two members to a temperature lower than melting point temperatures of the metals and not lower than a eutectic temperature thereof to produce a liquid of eutectic composition by eutectic reaction between surfaces of the two members to be bonded;
   applying an upset pressure $P_2$ higher than said contacting pressure $P_1$ to the surfaces of the two members to be bonded to squeeze out substantially all of the liquid eutectic composition from the contacting surfaces to outside; and
   cooling the bonded surfaces of the two members at a cooling rate for substantially preventing the production of a phase by eutectic reaction and an intermetallic compound phase on the bonded surfaces of the two members.

3. A method for pressure bonding metal members by utilizing eutectic reaction as set forth in claim 2, wherein one of said contacting surfaces of said two metal members is formed with at least one projecting portion.

4. A method for pressure bonding to metal members by utilizing eutectic reaction the method comprising the steps of:
   bringing together a member of aluminum and a member of copper to be pressure bonded into contact with each other under a predetermined contacting pressure $P_1$, lower than plastic deformation pressure of the aluminum and copper and heating contact surfaces of the two members to a range between eutectic temperature and eutectic temperature $+50°$ C.;
   applying an upset pressure $P_2$ to the surfaces of the members to be bonded in a range of between 1.5 and 7.0 kg per mm² to squeeze out substantially all the liquid eutectic composition from the contacting surfaces to outside; and
   cooling the bonded surfaces of the two members at a cooling rate for substantially preventing the production of a phase by eutectic reaction and an intermetallic compound phase on the bonded surfaces of the two members.

5. A method for pressure bonding metal members by utilizing eutectic reaction as set forth in claim 2, wherein said dissimilar metals are copper and silver.

6. A method for pressure bonding metal members by utilizing eutectic reaction, comprising the steps of:
   bringing two members of dissimilar metals to be pressure bonded into contact with each other under a predetermined contacting pressure $P_1$ lower than a plastic deformation pressure of the metals of the two members and heating contact surfaces of the two members to a temperature lower than a melting point temperature of the metals and not lower than a eutectic temperature thereof to produce a liquid of eutectic composition by eutectic reaction between surfaces of the two members to be bonded;
   applying an upset pressure $P_2$ higher than said contacting pressure $P_1$ to the surfaces of the two members to be bonded to squeeze out substantially all of the liquid of eutectic composition from the contacting surfaces to outside; and
   rapidly cooling the bonded surfaces of the two members at a cooling rate for substantially preventing the production of a phase by eutectic reaction and an intermediate compound phase on the bonded surfaces of the two members.

7. A method for pressure bonding metal members by utilizing eutectic reaction as set forth in claim 6, wherein said dissimilar metals are aluminum and copper.

8. A method for pressure bonding metal members by utilizing eutectic reaction as set forth in claim 6, wherein said dissimilar metals are copper and silver.

9. A method for pressure bonding metal members by utilizing eutectic reaction, comprising the steps of:

placing an insert between two members of the same metal to be pressure bonded to maintain contacting surfaces of the two members and the insert interposed therebetween under a predetermined contacting pressure $P_1$ lower than plastic deformation pressures of the metal of the two members, said insert comprising an element undergoing eutectic reaction with the metal of the two members, and heating the contacting surfaces of the two members and the insert therebetween to a temperature lower than a melting point temperature of the metal of the two members and not lower than a eutectic temperature of the element of the insert and the metal of the two members to produce a liquid of eutectic composition by eutectic reaction between the surfaces of the two members to be bonded;

applying an upset pressure $P_2$ higher than said contacting pressure $P_1$ to the surfaces of the two members to be bonded to squeeze out substantially all of the liquid of eutectic composition from the contacting surfaces to outside; and cooling the bonded surfaces of the two members.

10. A method for pressure bonding metal members by utilizing eutectic reaction as set forth in claim 9, wherein said metal forming said two members is aluminum, and wherein said insert is formed of copper.

11. A method for pressure bonding metal members by utilizing eutectic reaction as set forth in claim 9, wherein said metal forming said two members is aluminum, and wherein said insert is formed of silver.

12. A method for pressure bonding metal members by utilizing eutectic reaction as set forth in claim 9, wherein said metal forming said two members is aluminum, and wherein said insert is formed of silicon.

13. A method for pressure bonding metal members by utilizing eutectic reaction as set forth in claim 9, wherein said metal forming said two members is aluminum, and wherein said insert is formed of a material selected from the group consisting of hypereutectic alloys of aluminum and silver, aluminum and copper and aluminum and silicon.

14. A method for pressure bonding metal members by utilizing eutectic reaction as set forth in claim 9, wherein said metal forming said two members is copper, and wherein said insert is formed of silver.

15. A method for pressure bonding metal members by utilizing eutectic reaction as set forth in claim 9, wherein said metal forming said two members is copper, and wherein said inset is formed of aluminum.

16. A method for pressure bonding metal members by utilizing eutectic reaction as set forth in claim 9, wherein said metal forming said two members is copper, and wherein said insert is formed of a material selected from the group consisting of the hypereutectic alloys of copper and silver and copper and aluminum.

17. A method for pressure bonding metal members by utilizing eutectic reaction as set forth in claim 1, wherein the contacting pressure applied is sufficient to squeeze out all of the liquid eutectic composition remaining between the contacting surfaces.

18. A method for pressure bonding metal members by utilizing eutectic reaction as set forth in claim 1, wherein the step of increasing the contacting pressure includes applying the contact pressure with an impact.

19. A method for pressure bonding metal members by utilizing eutectic reaction as set forth in one of claims 2, 6, or 9, wherein the upsetting pressure applied is sufficinet to squeeze out all of the liquid eutectic composition remaining between the contacting surfaces.

20. A method for pressure bonding metal members by utilizing eutectic reaction as set forth in one of claims 2, 6, or 9, wherein the upset pressure is applied with an impact.

* * * * *